(12) United States Patent
Yuksek et al.

(10) Patent No.: US 10,447,135 B2
(45) Date of Patent: Oct. 15, 2019

(54) DEVICE FOR GENERATING ELECTRICAL POWER FROM LOW FREQUENCY OSCILLATIONS

(71) Applicants: Nuh Sadi Yuksek, Columbia, MO (US); Mahmoud Almasri, Columbia, MO (US)

(72) Inventors: Nuh Sadi Yuksek, Columbia, MO (US); Mahmoud Almasri, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 275 days.

(21) Appl. No.: 15/279,063

(22) Filed: Sep. 28, 2016

(65) Prior Publication Data
US 2017/0093267 A1   Mar. 30, 2017

Related U.S. Application Data

(60) Provisional application No. 62/233,781, filed on Sep. 28, 2015.

(51) Int. Cl.
*H02N 2/18* (2006.01)
*H02K 35/04* (2006.01)
(Continued)

(52) U.S. Cl.
CPC ........... *H02K 35/04* (2013.01); *H02K 7/1876* (2013.01); *H02N 1/08* (2013.01); *H02N 2/188* (2013.01)

(58) Field of Classification Search
CPC .......... H02N 2/188; H02N 2/186; H02N 2/08; H02K 7/1876; H02K 35/04; H01L 41/113
See application file for complete search history.

(56) References Cited

U.S. PATENT DOCUMENTS

| 3,457,463 A * | 7/1969 | Balamuth | ................ G01H 3/08 |
| | | | 310/26 |
| 5,801,475 A * | 9/1998 | Kimura | ................... G01P 13/00 |
| | | | 310/319 |

(Continued)

OTHER PUBLICATIONS

Umeda, Mikio et al., "Analysis of the Transformation of Mechanical Impact Energy to Electric Energy Using Piezoelectric Vibrator", Jpn. J. Appl. Phys. vol. 35 (1996) pp. 3267-3273.

(Continued)

*Primary Examiner* — J. San Martin
(74) *Attorney, Agent, or Firm* — Shook, Hardy & Bacon, LLP

(57) ABSTRACT

An energy harvesting device for generating electrical power from low-frequency oscillations includes a high-frequency cantilever, a plurality of low-frequency cantilevers each configured to contact the high-frequency cantilever in response to environmental vibrations having a frequency within a near-resonance frequency range associated with said low-frequency cantilever, an a generator that produces electrical power in response to contact between at least one of the plurality of low-frequency cantilevers and the high-frequency cantilever. The energy harvesting device may also include an impact mass coupled to a free end of each of the plurality of low-frequency cantilevers. Some aspects may include a common base to which the high-frequency cantilever and the plurality of low-frequency cantilevers are coupled. Other aspects may include the generator comprising one or more of an induction coil and magnet, a variable distance capacitor, or a piezo-electric material.

16 Claims, 15 Drawing Sheets

(51) Int. Cl.
*H02N 1/08* (2006.01)
*H02K 7/18* (2006.01)

(56) References Cited

U.S. PATENT DOCUMENTS

| | | | | |
|---|---|---|---|---|
| 6,223,601 | B1 * | 5/2001 | Harada | G01H 1/14 |
| | | | | 310/321 |
| 8,143,765 | B1 * | 3/2012 | Yegingil | H02N 2/186 |
| | | | | 310/330 |
| 8,631,703 | B2 * | 1/2014 | Nagai | G01C 19/00 |
| | | | | 73/514.02 |
| 8,749,121 | B2 * | 6/2014 | Fujimoto | H01L 41/1136 |
| | | | | 310/332 |
| 2009/0315431 | A1 * | 12/2009 | Rastegar | H01L 41/1136 |
| | | | | 310/331 |
| 2011/0162451 | A1 * | 7/2011 | Petelenz | A42B 3/046 |
| | | | | 73/514.01 |
| 2012/0153778 | A1 * | 6/2012 | Jun | H02N 2/186 |
| | | | | 310/330 |
| 2013/0050352 | A1 * | 2/2013 | Koda | B41J 2/14274 |
| | | | | 347/70 |
| 2013/0062999 | A1 * | 3/2013 | Muker-Uz-Zaman | |
| | | | | H02N 2/186 |
| | | | | 310/339 |
| 2013/0313946 | A1 * | 11/2013 | Lee | H02N 2/186 |
| | | | | 310/339 |
| 2015/0365018 | A1 * | 12/2015 | Inman | H01L 41/1136 |
| | | | | 310/331 |
| 2016/0013396 | A1 * | 1/2016 | Chung | H01L 41/1136 |
| | | | | 310/332 |
| 2017/0077839 | A1 * | 3/2017 | Karami | H02N 2/186 |
| | | | | 310/330 |

OTHER PUBLICATIONS

Jung, Seok-Min et al., "Energy-harvesting device with mechanical frequency-up conversion mechanism for increased power efficiency and wideband operation", Applied Physics Letters 96, 111906 (2010); doi: 10.1063/1.3360219, 4 pages.

Renaud, Michael et al., "Corrigendum: Harvesting energy from the motion of human limbs: the design and analysis of an impact-based piezoelectric generator", Published Mar. 19, 2012, Smart Mater. Struct. 21 (2012) 049501, 18 pages.

Zorlu, Ozge et al., "A MEMS-based energy harvester for generating energy from non-resonant environmental vibrations", Published Jan. 26, 2013, Sensors and Actuators A 202 (2013) pp. 124-134.

Gu, Lei et al., "Impact-driven, frequency up-converting coupled vibration energy harvesting device for low frequency operation", Published Mar. 8, 2011, Smart Mater. Struct. 20 (2011) 045004, 10 pages.

Halim, Miah et al., "A non-resonant, frequency up-converted electromagnetic energy harvester from human-body-induced vibration for hand-held smart system applications", Journal of Applied Physics 115, 094901 (2014); doi: 10.1063/1.4867216, 7 pages.

* cited by examiner

DEVICE FOR GENERATING ELECTRICAL POWER FROM LOW FREQUENCY OSCILLATIONS

CROSS-REFERENCE TO RELATED APPLICATIONS

This application claims priority to U.S. Provisional Application 62/233,781, filed Sep. 28, 2015, entitled "Method and Electromagnetic Inertial Micro Device for Generating Electrical Power from Low Frequency Oscillations," the entirety of which is incorporated herein by reference.

STATEMENT REGARDING FEDERALLY SPONSORED RESEARCH OR DEVELOPMENT

None.

FIELD

The present invention relates generally to a device for generating electrical power from low-frequency environmental vibrations.

BACKGROUND

Mechanical vibration may be encountered in many different environments and often the energy of such vibration is lost as it is dampened. In some cases, the mechanical vibration may be harvested and converted into electrical power (for example, through induction or the piezo-electric effect). In many cases, converting the mechanical vibration into electrical power is more efficient with high-frequency vibrations. For example, efficient electrical power generation by induction may be achieved with mechanical vibration having a frequency of at least 200 Hz. In many environments, however, only low-frequency (e.g., 10 Hz to 70 Hz) mechanical vibration occurs. Further, the frequency of the mechanical vibration may not be constant but likely varies over a range of frequencies.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, this disclosure generally describes an energy harvesting device that uses low-frequency mechanical vibrations to generate an electrical power. The electrical power may be generated by a variety of methods. For example, the electrical power may be generated by induction, capacitance, or the piezo-electric effect. The low-frequency mechanical vibrations may be converted to a high-frequency mechanical vibration through impact between two objects. For example, low-frequency mechanical vibrations may be received from an environment causing a first object to contact a second object. The impact between the two objects may result in the second object mechanically vibrating at its resonance frequency. The resonance frequency of one or both objects may be controlled. Hence, the second object may be configured to mechanically vibrate at a high-frequency (e.g., at least 200 Hz).

The objects may oscillate with a higher magnitude of deflection when the mechanical vibration has a frequency at or near the resonance frequency of the objects (the "near-resonance frequency range"). Continuing the above example, in one aspect the first object may have a resonance frequency of 13 Hz and a near-resonance frequency range from 10 Hz to 22 Hz. The first object may be spaced apart from the second object such that only mechanical vibration having a frequency within the near-resonance frequency range will cause the first object to contact the second object. Multiple first objects having different near-resonance frequency ranges may be included within an energy harvesting device such that the energy harvesting device will have a wider bandwidth across which low-frequencies may be converted into high-frequencies. Therefore, the energy harvesting device is able to efficiently generate electrical power from a wide range of low-frequency mechanical vibration.

BRIEF DESCRIPTION OF THE DRAWINGS

The present invention is described in detail herein with reference to the attached drawing figures, which are incorporated herein by reference, wherein.

DETAILED DESCRIPTION

Figure 1A:
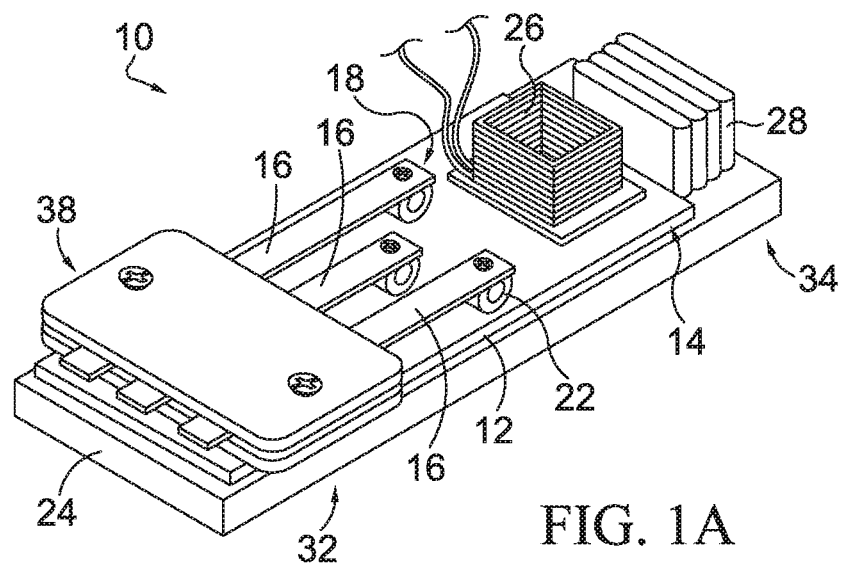
FIG. 1A depicts a perspective view of an exemplary energy harvesting device in accordance with an aspect hereof.
Figure 1B:
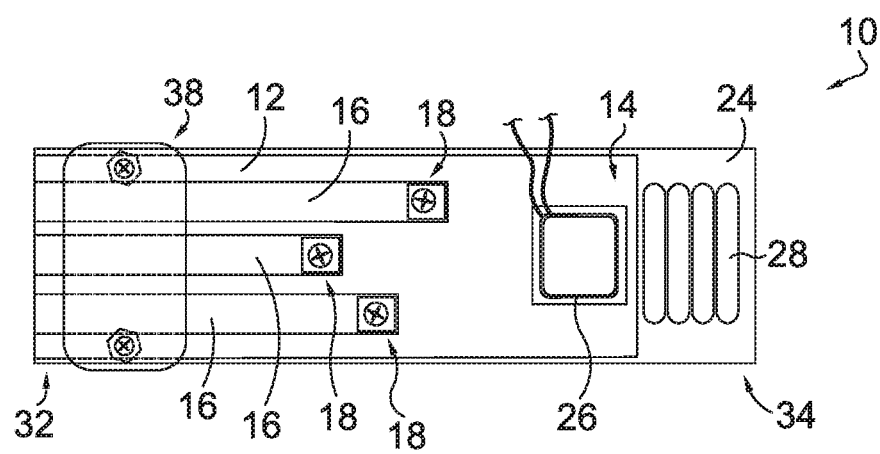
FIG. 1B depicts a side view of the exemplary energy harvesting device of FIG. 1A in accordance with an aspect hereof.
Figure 1C:
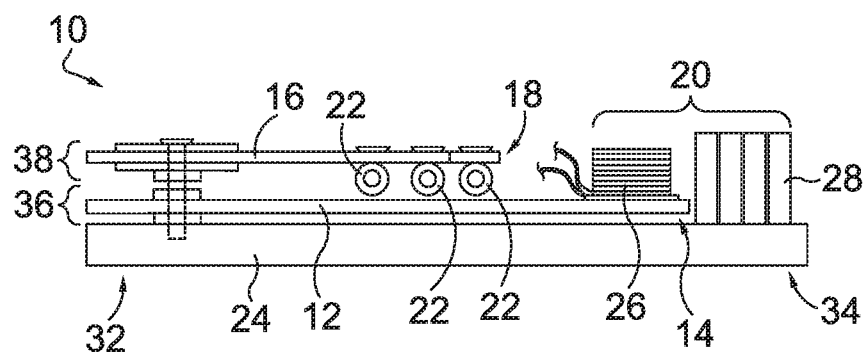
FIG. 1C depicts a top view of the exemplary energy harvesting device of FIG. 1A in accordance with an aspect hereof.
Figure 1D:
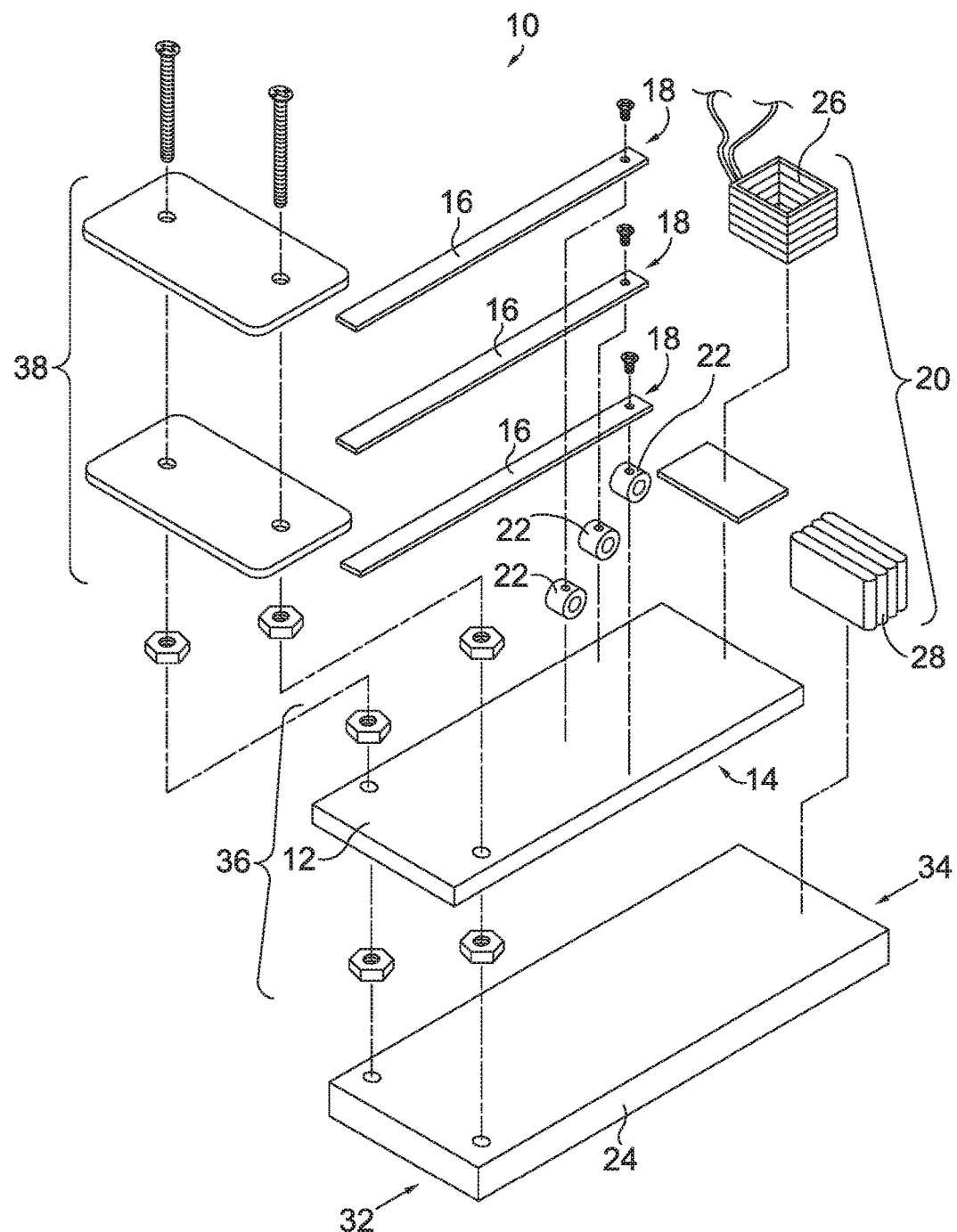
FIG. 1D depicts an exploded view of the exemplary energy harvesting device of FIG. 1A in accordance with an aspect hereof.
Figure 2A:
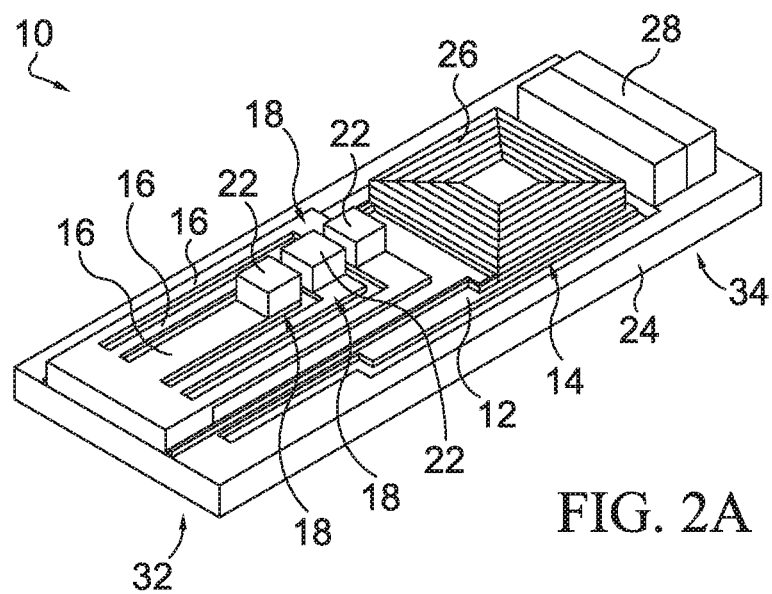
FIG. 2A depicts a perspective view of an exemplary energy harvesting device in accordance with an aspect hereof.
Figure 2B:
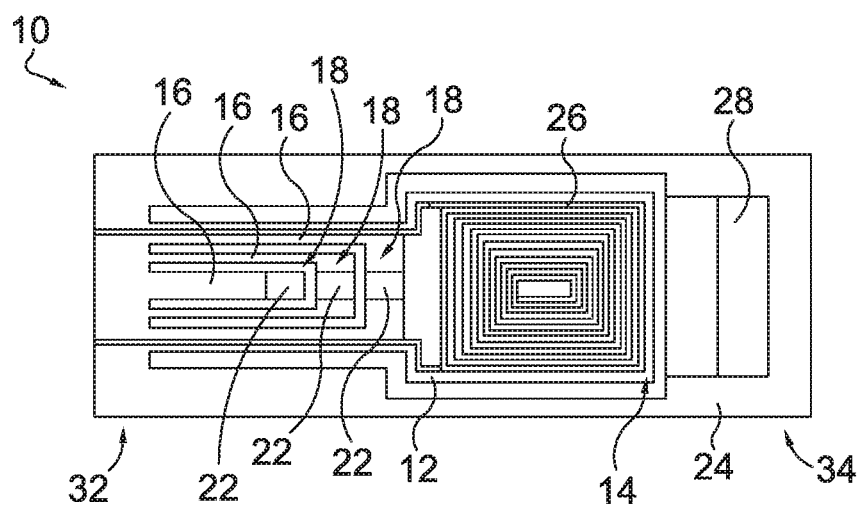
FIG. 2B depicts a side view of the exemplary energy harvesting device of FIG. 2A in accordance with an aspect hereof.
Figure 2C:
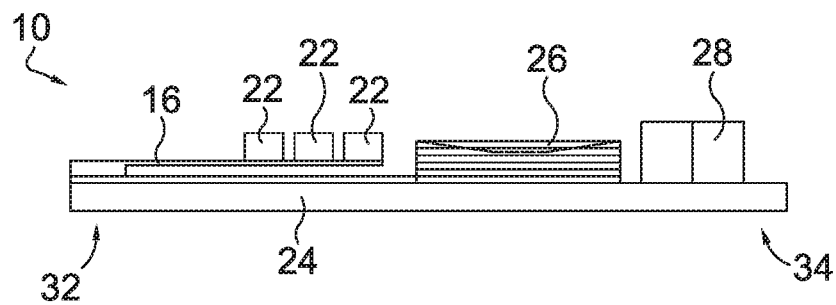
FIG. 2C depicts a top view of the exemplary energy harvesting device of FIG. 2A in accordance with an aspect hereof.
Figure 2D:
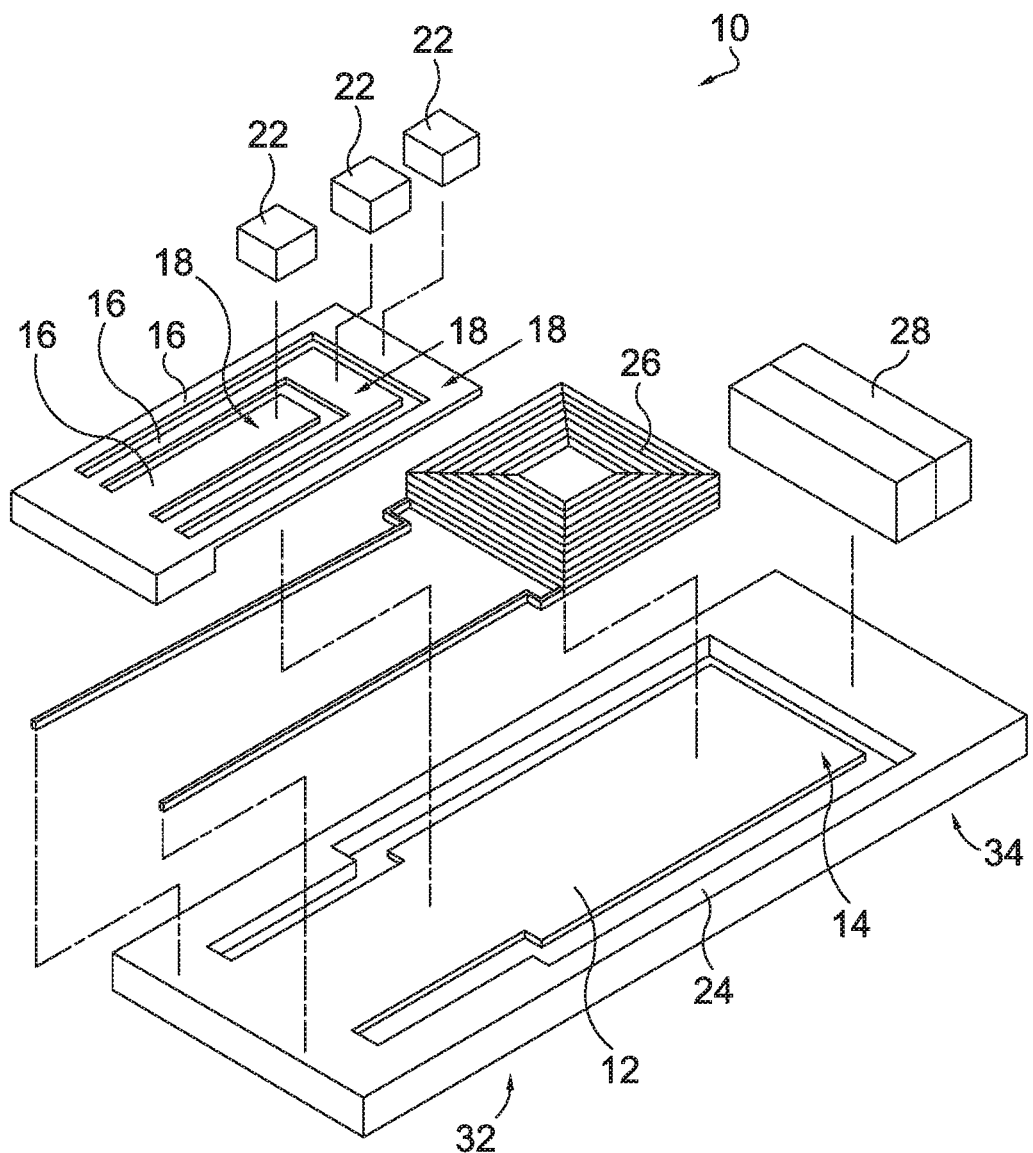
FIG. 2D depicts an exploded view of the exemplary energy harvesting device of FIG. 2A in accordance with an aspect hereof.
Figure 3A:
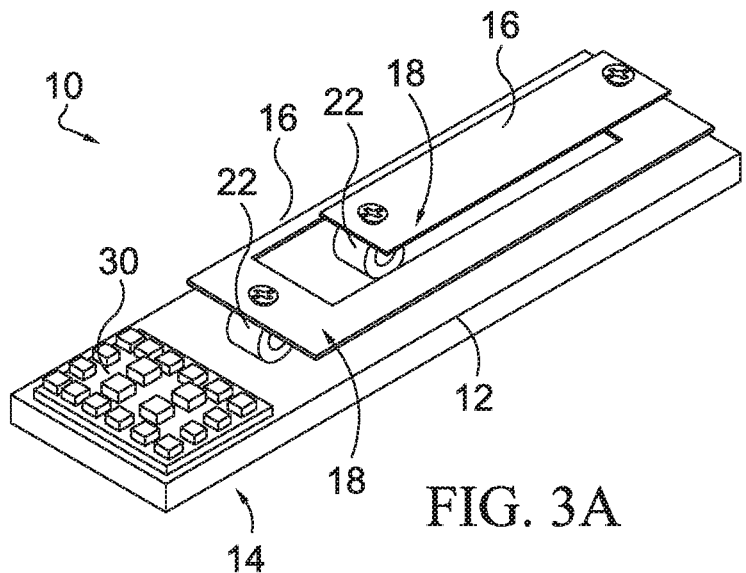
FIG. 3A depicts a perspective view of an exemplary energy harvesting device in accordance with an aspect hereof.
Figure 3B:
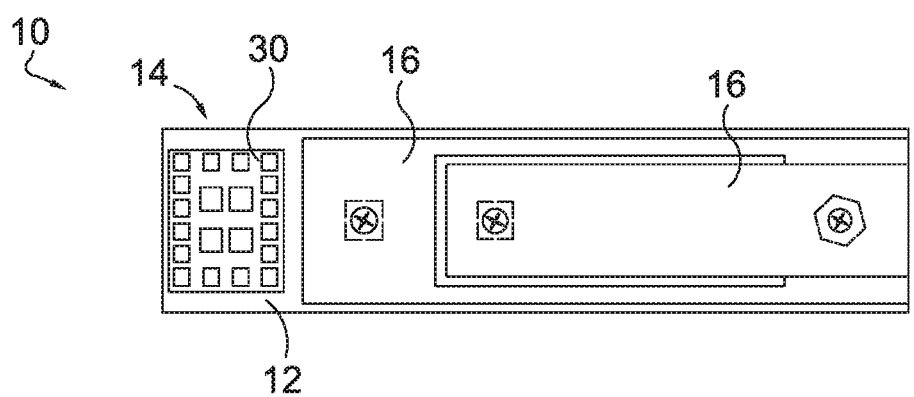
FIG. 3B depicts a side view of the exemplary energy harvesting device of FIG. 3A in accordance with an aspect hereof.
Figure 3C:
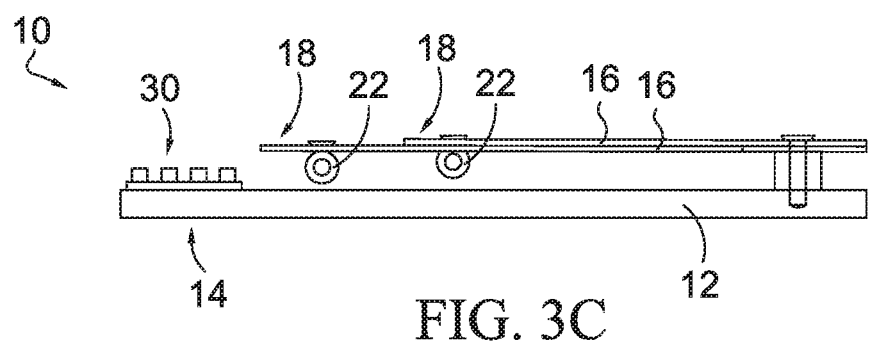
FIG. 3C depicts a top view of the exemplary energy harvesting device of FIG. 3A in accordance with an aspect hereof.
Figure 3D:
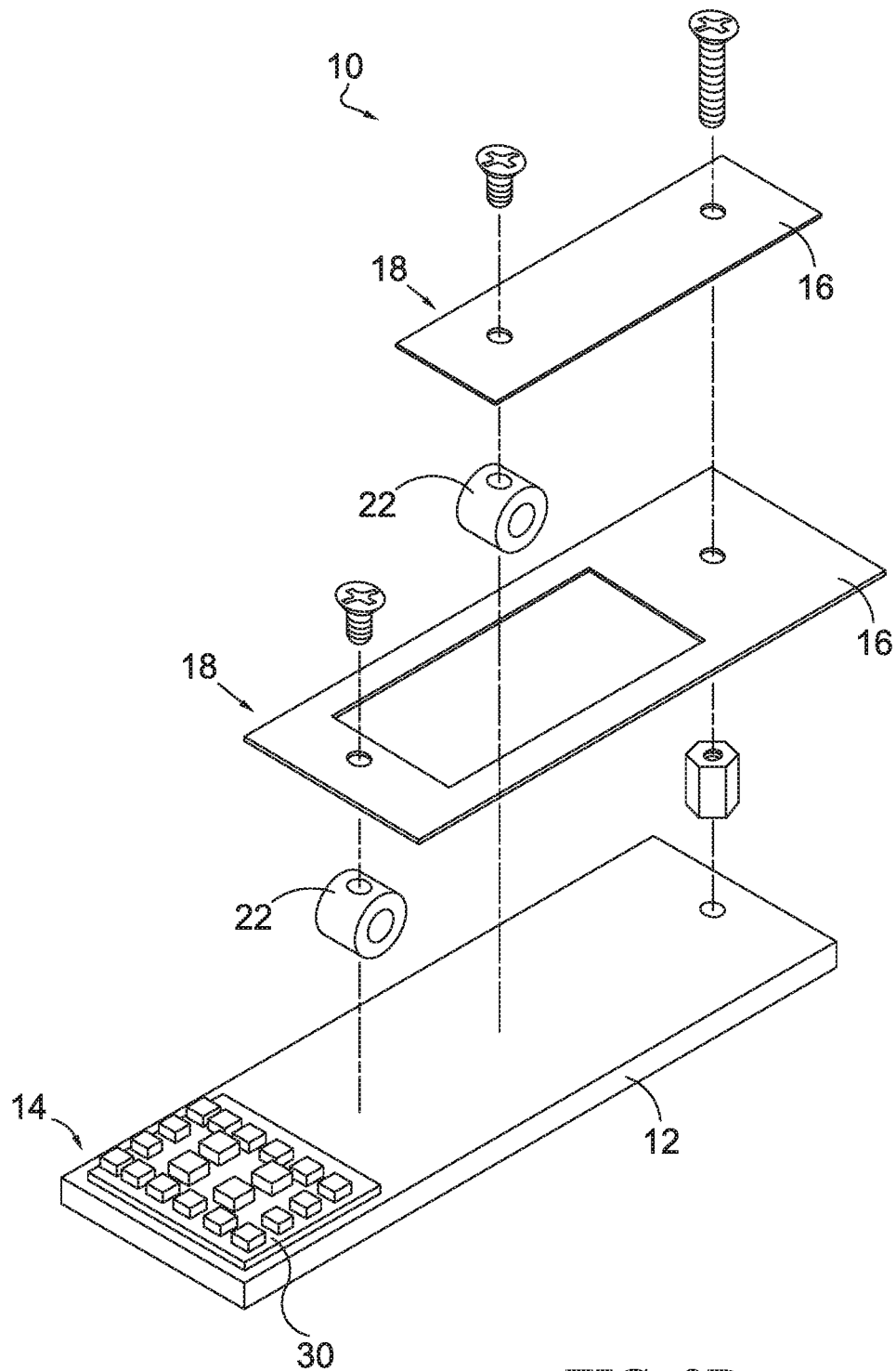
FIG. 3D depicts an exploded view of the exemplary energy harvesting device of FIG. 3A in accordance with an aspect hereof.

Subject matter is described throughout this disclosure in detail and with specificity in order to meet statutory requirements. But the aspects described throughout this disclosure are intended to be illustrative rather than restrictive, and the description itself is not intended necessarily to limit the scope of the claims. Rather, the claimed subject matter might be practiced in other ways to include different elements or combinations of elements that are similar to the ones described in this disclosure and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by and is within the scope of the claims.

At a high level, this disclosure generally describes an energy harvesting device that uses low-frequency mechanical vibrations to generate an electrical power. The electrical power may be generated by a variety of methods. For example, the electrical power may be generated by induction, capacitance, or the piezo-electric effect. The low-frequency mechanical vibrations may be converted to a high-frequency mechanical vibration through impact between two objects. For example, low-frequency mechanical vibrations may be received from an environment causing a first object to contact a second object. The impact between the two objects may result in the second object mechanically vibrating at its resonance frequency. The resonance frequency of one or both objects may be controlled. Hence, the second object may be configured to mechanically vibrate at a high-frequency (e.g., at least 200 Hz).

The objects may oscillate with a higher magnitude of deflection when the mechanical vibration has a frequency at or near the resonance frequency of the objects (the "near-resonance frequency range"). Continuing the above example, the first object may have a resonance frequency of 25 Hz and a near-resonance frequency range from 10 Hz to 30 Hz. The first object may be spaced apart from the second object such that only mechanical vibration having a frequency within the near-resonance frequency range will cause the first object to contact the second object. Stated another way, the near-resonance frequency range is the range of frequencies within which the first object will contact the second object. Multiple first objects having different near-resonance frequency ranges may be included within an energy harvesting device such that the energy harvesting device will have a wider bandwidth across which low-frequencies may be converted into high-frequencies (i.e., the near-resonance frequency range of each first object may be adjacent one another or may even overlap). Such an energy harvesting device would therefore be able to efficiently generate electrical power from a wide range of low-frequency mechanical vibration.

A first object, as a result of low-frequency vibration, may contact (e.g., strike, hammer, impact, etc.) a second object. The impact from the first object may cause the second object to vibrate at the resonance frequency of the second object for a period of time. Objects receiving vibrations at or near the resonance frequency of the object will oscillate. In other words, there is a frequency range within which received vibrations will cause oscillation.

One aspect disclosed herein is directed to an energy harvesting device for generating electrical power from low-frequency oscillations, and includes a high-frequency cantilever having a free end, a plurality of low-frequency cantilevers, and a generator. Each of the plurality of low-frequency cantilevers may include a free end configured to contact the high-frequency cantilever in response to environmental vibrations having a frequency within a near-resonance frequency range associated with said low-frequency cantilever. The generator may be configured to produce electrical power in response to contact between at least one of the plurality of low-frequency cantilevers and the high-frequency cantilever.

The energy harvesting device may also include an impact mass coupled proximately to the free end of each of the plurality of low-frequency cantilevers. The mass of each of the impact masses may be greater than the mass of the generator. In some aspects, the impact mass coupled to each of the plurality of low-frequency cantilevers is positioned between the respective low-frequency cantilever and the high-frequency cantilever.

The high-frequency cantilever may have a resonance frequency of at least 200 Hz, in accordance with some aspects. At least one of the plurality of low-frequency cantilevers may contact the high-frequency cantilever when mechanical vibrations having a frequency between 10 Hz and 66 Hz are received by the energy harvesting device. In some aspects, the plurality of low-frequency cantilevers may comprise a first low-frequency cantilever and a second low-frequency cantilever. In such aspects, the first low-frequency cantilever may have a first near-resonance frequency range between 10 Hz and 35 Hz, and the second low-frequency cantilever may have a second near-resonance frequency range between 30 Hz and 66 Hz. In further aspects, the plurality of low-frequency cantilevers may also comprise a third low-frequency cantilever. In those aspects, the first low-frequency cantilever may have a first near-resonance frequency range between 10 Hz and 27 Hz, the second low-frequency cantilever may have a second near-resonance frequency range between 22 Hz and 34 Hz, and the third low-frequency cantilever may have a third near-resonance frequency range between 31 Hz and 66 Hz.

The energy harvesting device may also include a common base. The high-frequency cantilever and the plurality of low-frequency cantilevers may each be coupled to the common base, in accordance with some aspects. The generator may comprise an induction mechanism that includes a conductor and a magnet. In some aspects, the conductor is coupled to the high-frequency cantilever proximate the free end. The magnet may be coupled to the common base proximate the free end of the high-frequency cantilever. The conductor may comprise a copper winding having at least 100 turns. In other aspects, the generator may comprise a variable distance capacitor. The variable distance capacitor may be coupled to the high-frequency cantilever proximate the free end. In still other aspects, the generator may be integral to the high-frequency cantilever. The generator may comprise at least a portion of the high-frequency cantilever being formed from a piezo-electric material.

Another aspect disclosed herein is directed to an induction device for generating electrical power from low-frequency environmental vibrations. The induction device may include a common base that has a first end opposite a second end. The induction device may also include a high-frequency cantilever being fixed at a first coupling and extending away from the first coupling to a free end. The high-frequency cantilever may be coupled proximate to the first end of the common base. The free end of the high-frequency cantilever may be positioned proximate to the second end of the common base. The induction device may also include a permanent magnet and a copper winding. The permanent magnet may be coupled proximately to the second end of the common base. The copper winding may be coupled to the high-frequency cantilever proximate the free end. The induction device may also include a plurality of low-frequency cantilevers being fixed at a second coupling. Each of the plurality of low-frequency cantilevers may extend away from the second coupling to a free end. In some aspects, each of the plurality of low-frequency cantilevers have a different near-resonance frequency range. Environmental vibrations encountered by the induction device having a frequency within at least one of the near-resonance frequency ranges causes the free end of at least one of the plurality of low-frequency cantilevers to contact the high-frequency cantilever, in accordance with an aspect disclosed herein.

The induction device may include an impact mass coupled proximately to the free end of each of the plurality of low-frequency cantilevers. The mass of each impact mass may exceed the mass of the copper winding. In some aspects, the high-frequency cantilever may be comprised of a piezo-electric material. In such aspects, the electrical power generated from one or more of the free ends of the plurality of low-frequency cantilevers contacting the piezo-electric material may be transmitted away from the induction device in series with the electrical power generated from the free end of the high-frequency cantilever oscillating the copper winding through the magnetic field.

Turning to FIGS. 1A-1D, one embodiment of an energy harvesting device will now be disclosed. Referring initially to FIG. 1, an energy harvesting device 10 may include a high-frequency cantilever 12 having a free end 14, a plurality of low-frequency cantilevers 16 each having a free end 18, and each configured to contact the high-frequency cantilever 12 when certain low-frequency mechanical vibration is received, and a generator 20 (best seen in FIGS. 1C and 1D) associated with the free end 14 of the high-frequency cantilever 12.

The high-frequency cantilever 12 may be comprised of an Aluminum beam having a high resonance frequency. The high resonance frequency of the high-frequency cantilever 12 is at least 200 Hz, in accordance with some aspects. In other aspects, the high resonance frequency of the high-frequency cantilever 12 is between 200 Hz and 700 Hz. The high resonance frequency of the high-frequency cantilever 12 may be controlled by controlling the type of material and the length, width, and thickness of the high-frequency cantilever. When the high-frequency cantilever 12 is impacted (for example by the free end 18 of one of the plurality of low-frequency cantilevers 16) it will oscillate at its resonance frequency for a period of time (e.g., 50 milliseconds).

The plurality of low-frequency cantilevers 16 may comprise two low-frequency cantilevers (as shown in FIGS. 3A-D), three low-frequency cantilevers (as shown in FIGS. 1A-D and 2A-D), or more than three low-frequency cantilevers (not shown). Each of the low-frequency cantilevers 16 may include a free end 18. In some aspects, an impact mass 22 may be coupled to the free end 18 of each of the plurality of low-frequency cantilevers 16 (as shown in FIGS. 1A-D). The impact masses 22 may be coupled on any side of the free end, and do not necessarily have to be coupled below the free end 18 as shown in FIGS. 1A-D). In other aspects, each of the impact masses 22 may be integral to a respective low-frequency cantilever (as best seen in FIGS. 2A-D). The mass of the impact mass 22 is at least equal to the mass of the generator component mounted on the high-frequency cantilever 12, in accordance with some aspects. For example, each impact mass 22 may have a mass of at least 4 grams. The placement and mass of the impact mass 22 may be used to control the resonance frequency of each of the plurality of low-frequency cantilevers 16.

In one aspect, each of the plurality of low-frequency cantilevers 16 is comprised of Aluminum sheet. In another aspect, each of the plurality of low-frequency cantilevers 16 is comprised of Brass sheet. The plurality of low-frequency cantilevers 16 may be comprised of any other suitable material having a suitable resonance frequency and near-resonance frequency range.

In operation, the free end 18 of each of the plurality of low-frequency cantilevers 16 is positioned with respect to the high-frequency cantilever 12, such that when mechanical vibration having a frequency within a near-resonance frequency range associated with at least one of the plurality of low-frequency cantilevers 16 is received, the free end 18 of the at least one of the plurality of low-frequency cantilevers 16 contacts the high-frequency cantilever 12. When mechanical vibration having a frequency outside of all of the near-resonance frequency ranges associated with the plurality of low-frequency cantilevers 16 is received, the plurality of low-frequency cantilevers 16 may not contact the high-frequency cantilever 12.

In aspects having a first low-frequency cantilever 16a and a second low frequency cantilever 16b, the first low-frequency cantilever 16a may have a near-resonance frequency range of 10 Hz to 35 Hz, and the second low-frequency cantilever 16b may have a near-resonance frequency range of 30 Hz to 66 Hz. In these aspects, when mechanical vibration having a frequency within 10 Hz to 66 Hz is received, one or both of the low-frequency cantilevers 16 will contact the high-frequency cantilever 12.

In aspects having a first low-frequency cantilever 16a, a second low frequency cantilever 16b, and a third low-frequency cantilever 16c, the first low-frequency cantilever 16a may have a near-resonance frequency range from 10 Hz to 27 Hz, the second low-frequency cantilever 16b may have a near-resonance frequency range of 22 Hz to 34 Hz, and the third low-frequency cantilever 16c may have a near-resonance frequency range of 31 Hz to 66 Hz. In these aspects, when mechanical vibration having a frequency within 10 Hz to 66 Hz is received, at least one of the low-frequency cantilevers 16 will contact the high-frequency cantilever 12.

The near-resonance frequency range for each of the plurality of low-frequency cantilevers 16 may overlap (as in the above examples), may be adjacent (such that no gaps between frequency ranges occur), or may be spaced apart (such that one or more gaps between frequency ranges occur).

The near-resonance frequency range for each of the plurality of low-frequency cantilevers 16 may also be dependent upon the acceleration associated with the mechanical vibration. For example, the near-resonance frequency range of an exemplary low-frequency cantilever may be 17 Hz to 30 Hz at 0.5 g, 14 Hz to 32 Hz at 1 g, and 10 Hz to 35 Hz at 2 g (where "g" represents the acceleration of gravity).

In some aspects, the energy harvesting device 10 may further include a common base 24. The common base 24 may have a first end 32 opposite a second end 34. The high-frequency cantilever 12 may be coupled to the common base 24. In some aspects, the high-frequency cantilever 12 is coupled to the common base 24 at a first coupling 36. The first coupling 36 may be proximate to the first end 32 of the common base 24. Likewise, the plurality of low-frequency cantilevers 16 may be coupled to the common base 24. In some aspects, the plurality of low-frequency cantilevers 16 may be coupled to the common base 24 at a second coupling 38. The second coupling 38 may be proximate to the first end 32 of the common base 24. In other aspects, the plurality of low-frequency cantilevers 16 may be coupled to the high-frequency cantilever 12.

The generator 20 may comprise an induction mechanism such as a conductor that is passed through a magnetic field. For example, the induction mechanism may comprise a copper winding 26 positioned proximate to a magnet 28. The copper winding 26 may have n-turns, where n is the desired number of turns. In some aspects, the copper winding 26 has 100 turns. In other aspects, the copper winding 26 has 200 turns. Any suitable number of turns is within the scope of this disclosure. The copper winding 26 may be comprised of 32 gauge copper wire or 36 gauge copper wire, in accordance with some aspects. The copper winding 26 may have a square shape having an area of 8 mm×8 mm. In other aspects, the copper winding 26 has an area of 12 mm×12 mm. The copper winding 26 may be coupled proximately to the free end 14 of the high-frequency cantilever 12.

The magnet 28 may comprise a permanent NdFeB magnet. For example, the magnet 28 may have a size of 0.375 inches by 0.375 inches by 0.625 inches and have a surface magnetic field of 6,950 GAUSS. The magnet 28 may be coupled to the common base 24 and positioned proximate to the free end 14 of the high-frequency cantilever 12. In some aspects, the magnet is coupled proximately to the second end 34 of the common base 24. In this configuration, the copper winding 26 moves relative to the magnet 28, and thus encounters a change in magnetic flux and an electromagnetic force is generated, as the high-frequency cantilever 12 oscillates in response to contact from at least one of the plurality of low-frequency cantilevers 16.

Turning to FIGS. 3A-3D, the generator 20 may comprise a variable distance capacitor 30 coupled to the free end 14 of the high-frequency cantilever 12. As used herein, the term variable distance capacitor means a capacitor that has a fixed electrode separated from a movable electrode, where the movable electrode may move closer to or away from the fixed electrode. Hence, the variable distance capacitor 30 includes a fixed electrode and a movable electrode such that as the high-frequency cantilever 12 oscillates, the movable electrode moves toward and away from the fixed electrode. One example of a variable distance capacitor is a MEMS capacitor such as is described in the article by J. Lin, J. Zhu, Z. Feng, M Almasri, entitled "Surface micromachined MEMS capacitors with dual cavity for energy harvesting", and published in J. Microelectromech. Syst., vol. 22(6), pp. 1458-1469, 2013. In this configuration, electrical power is generated in the variable distance capacitor 30 as the high-frequency cantilever 12 oscillates in response to contact from at least one of the plurality of low-frequency cantilevers 16.

The generator 20 may also include a piezo-electric material (not shown) that generates electrical power from mechanical stress applied thereto. For example, a piezo-electic material may be coupled to the high-frequency cantilever 12 and may generate electrical power in response to contact from at least one of the low-frequency cantilevers 16. In some aspects, the high-frequency cantilever 12 may be formed from a piezo-electric material. In other aspects, a piezo-electric material may be positioned proximate to the free end 14 of the high-frequency cantilever 12. In this configuration, electrical power is generated by the piezo-electric material as the high-frequency cantilever 12 oscillates and contacts the piezo-electric material in response to contact from at least one of the plurality of low-frequency cantilevers 16.

In some aspects, the generator 20 may comprise more than one of the above examples. For instance, the high-frequency cantilever 12 (or at least a portion thereof) may be comprised of a piezo-electric material and may also have a variable distance capacitor 30 and/or a copper winding 26 coupled to the free end 14. The electrical power generated from any of these combinations may be transmitted in series and/or in parallel.

Several working prototypes of exemplary energy harvesting devices have been fabricated and tested and are discussed in this disclosure as non-limiting examples.

Example 1

In a first embodiment, an energy harvesting device comprises a copper winding fixed proximate to a free end of a high-frequency cantilever fixed at one side. The high-frequency cantilever of this example is comprised of Aluminum and has a length of 70 mm, a width of 13 mm, a thickness of 3 mm and a resonance frequency of 410 Hz. The energy harvesting device of this example includes two low-frequency cantilevers configured to contact the high-frequency cantilever in response to mechanical vibration of a certain frequency. The two low-frequency cantilevers of this example are comprised of Aluminum sheet and have a length of 34 mm and 50 mm, a width of 9.5 mm and 8 mm, and a thickness of 0.3 mm, respectively. Each of the two low-frequency cantilever beams of this example have a thick impact mass attached proximate a respective free end. One of the two low-frequency cantilevers of this example is design to resonate at 25 Hz, while the other is designed to resonate at 50 Hz. The energy harvesting device of this example includes a square shaped permanent NdFeB magnet with a size of ⅜ inch by ⅜ inch by ⅝ inch and surface magnetic field of 6,950 Gauss positioned on a vibrating stage proximate to the free end of the high-frequency cantilever. The energy harvesting device of this example includes a copper winding having a square shape with an area of 8 mm×8 mm and made of 32 gauge copper wire with 100 turns. Each of the impact masses of this example has a mass of 4 grams and is used to reduce the low-frequency cantilevers' resonance frequencies and improve the momentum transfer to the high-frequency cantilever.

When the energy harvesting device was subjected to a low-frequency vibration using a shaker, the two low-frequency cantilevers responded by vibrating at low frequencies with at least one of them vibrating close to its resonance frequency, and their impact masses made contact with the high-frequency cantilever repeatedly at two locations. This contact caused the high-frequency cantilever along with the copper winding to oscillate, relative to the permanent magnet, with decaying amplitude at its resonance frequency, which is higher than that of the residual mechanical vibration of the structures. As the high-frequency cantilever oscillated in front of the magnet, an electromotive force ("EMF") proportional to the relative velocity of the coil and the magnetic field strength was generated. When the generated EMF was applied to a load connected in series with the copper winding, an electric current flowed through the copper winding due to the magnetic flux change per unit time.

Figure 4:
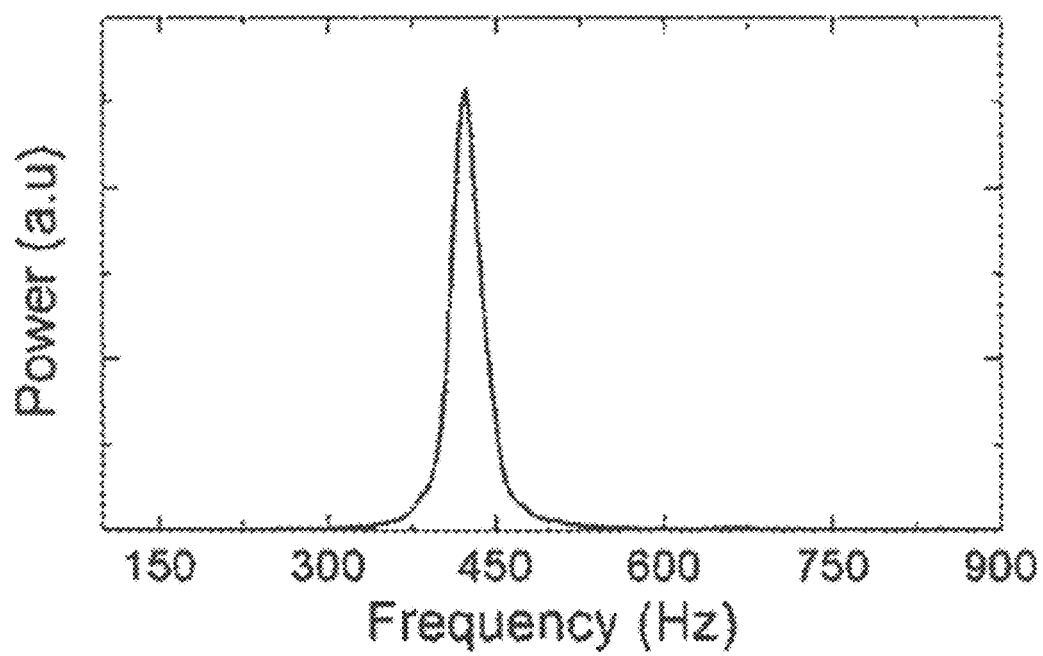
FIG. 4 is a plot of power output versus excitation frequency of the high-frequency cantilever from Example 1 below, in accordance with an aspect hereof.
Figure 5A:
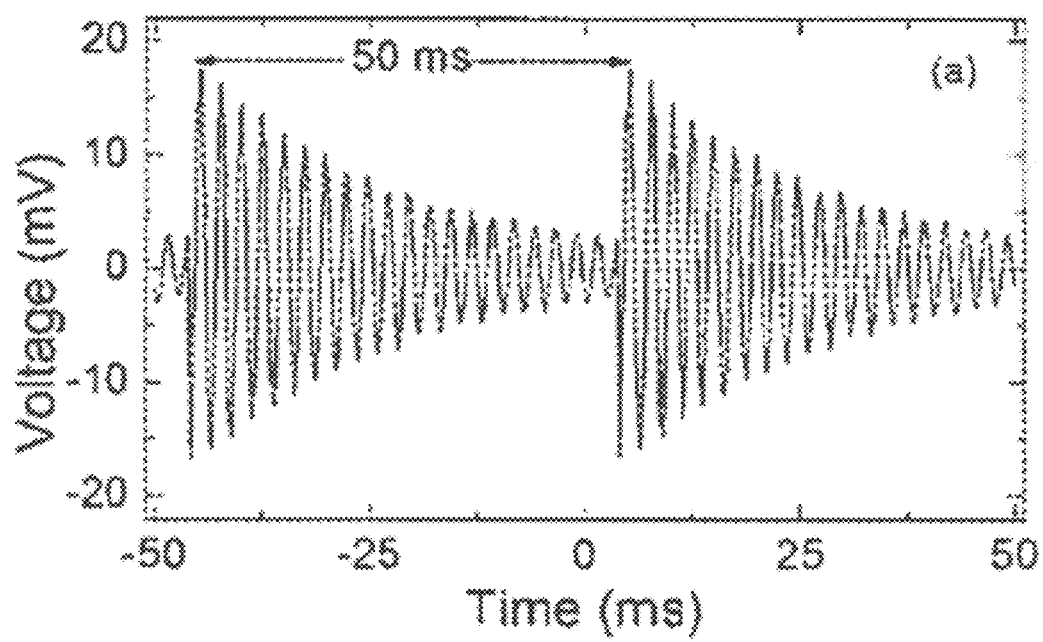
FIG. 5A is a plot of output voltage across the copper winding versus time from Example 1 below, in accordance with an aspect hereof.
Figure 5B:
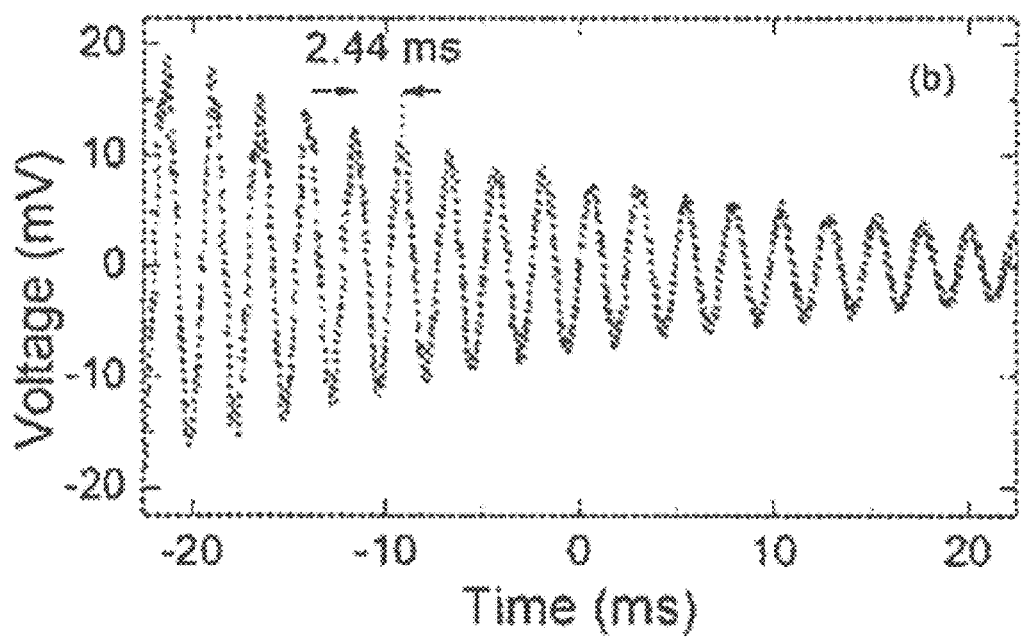
FIG. 5B is a plot of output voltage across the copper winding versus time from Example 1 below, in accordance with an aspect hereof.
Figure 6A:
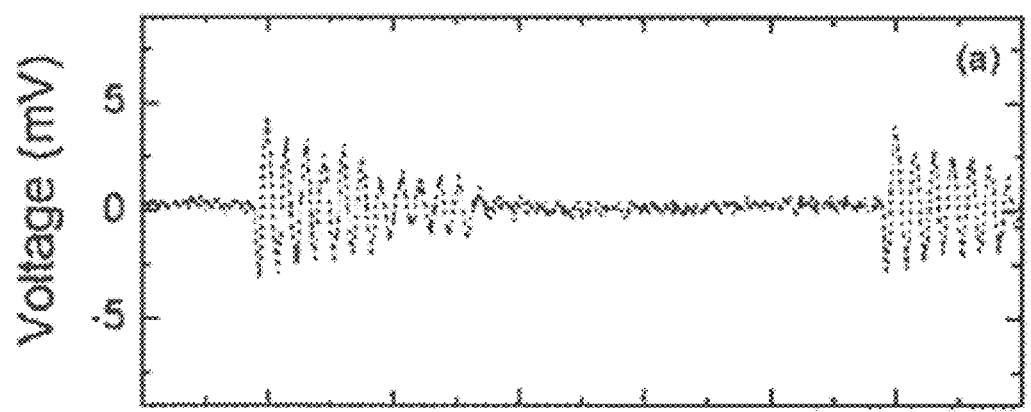
FIG. 6A is a plot of output voltage across the copper winding versus time at a 10 Hz excitation from Example 1 below, in accordance with an aspect hereof.
Figure 6B:
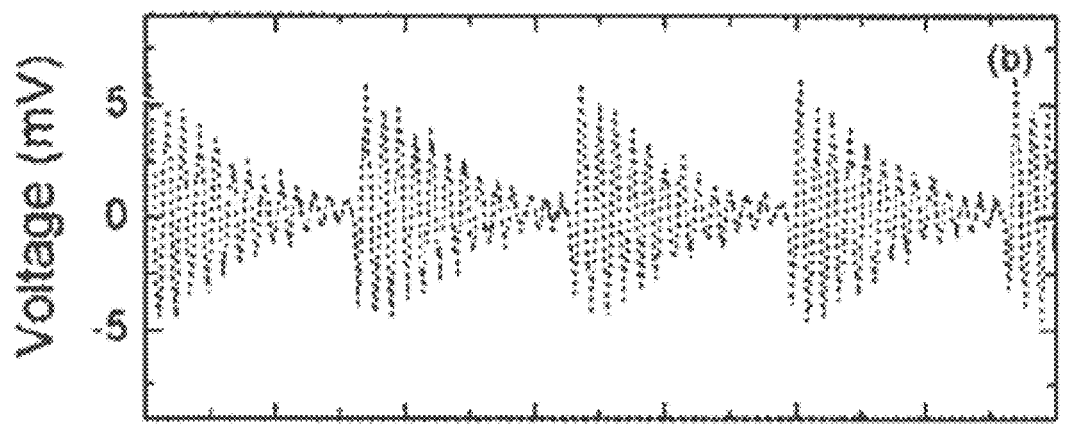
FIG. 6B is a plot of output voltage across the copper winding versus time at a 30 Hz excitation from Example 1 below, in accordance with an aspect hereof.
Figure 6C:
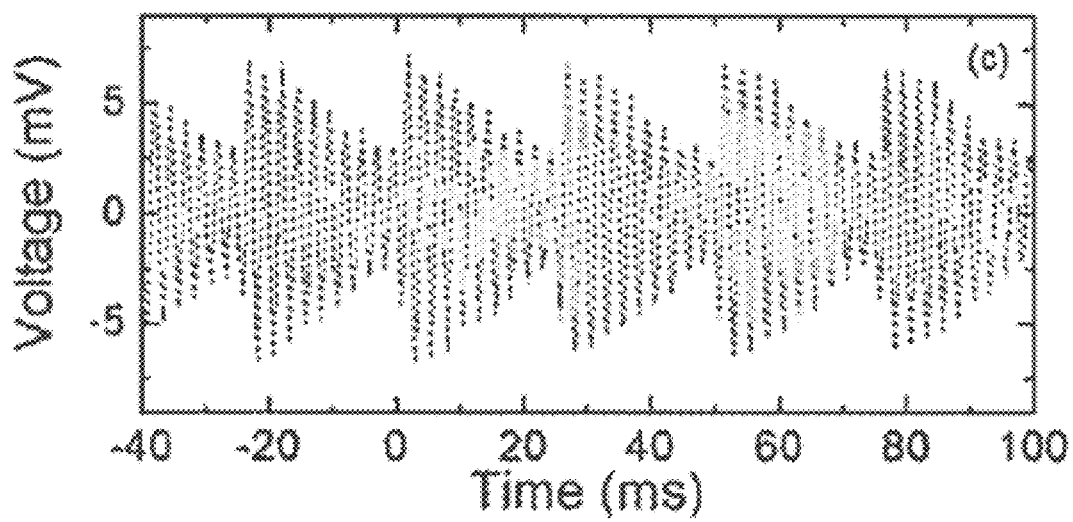
FIG. 6C is a plot of output voltage across the copper winding versus time at a 40 Hz excitation from Example 1 below, in accordance with an aspect hereof.

The energy harvesting device was characterized by fixing the device and the magnet on a rigid stage of a shaker. An AC signal with different frequencies was applied to the shaker, and the resulting output voltages were measured using an oscilloscope, a voltmeter, and a spectrum analyzer. The data was collected by a PC via a GPIB connection. To determine the resonance frequency of the high-frequency cantilever, the excitation frequency was swept from 100 Hz to 1 kHz, and the generated output voltages across the copper winding were measured using an open circuit measurement and a multimeter. Referring to FIG. 4, the resonance frequency of the high-frequency cantilever was observed around 410 Hz for low frequency excitation conditions. FIGS. 5A and 5B depict typical time domain plots of the measured output AC voltage across the copper winding, with a resistance of 2.68Ω, when the device was exposed to a mechanical vibration at 20 Hz. The plots show oscillations with decaying amplitude at the high-frequency cantilever's resonance frequency of 410 Hz and the impacts at low frequency vibration of 20 Hz are also evident. This demonstrates the ability for frequency up-conversion between the low-frequency cantilevers and the high-frequency cantilever. The decaying sine function fit to the output signal confirms that several modes are generated by the contact between at least one of the low-frequency cantilevers and the high-frequency cantilever. The higher order modes decay much faster than the fundamental mode and the fundamental mode survives between each contact. The frequency from the theoretical fit to the oscillations is also 410 Hz. Typical output voltage waveforms at excitation frequencies of 10 Hz, 30 Hz, and 40 Hz are shown in FIGS. 6A-6C, respectively. Regardless of the excitation frequency, the signal waveform is a decaying sinusoidal function with a frequency of 410 Hz. The corresponding time interval between the impacts is clearly observable for each frequency. For 10 Hz excitation, the signal decays and dies out completely between consecutive impacts. This reduces efficiency of the device at lower frequencies. On the other hand, for 20 Hz mechanical vibrations, or higher, the decaying waveform does not die completely between consecutive impacts and results in much higher efficiency.

Figure 7:
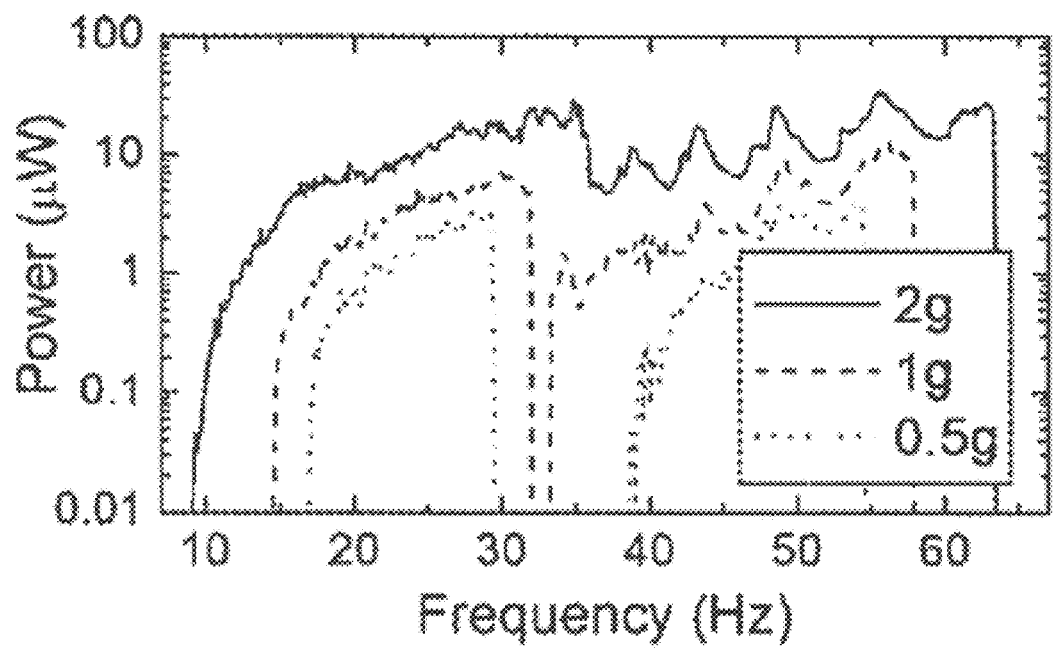
FIG. 7 is a plot of output power versus excitation frequency from Example 1 below, in accordance with an aspect hereof.

Referring now to FIG. 7, to estimate the response bandwidth, the devices were first characterized by sweeping excitation frequency from 5 Hz to 65 Hz with steps of 0.1 Hz under sinusoidal excitations with a constant acceleration of 0.5 g, 1 g, and 2 g, while the output voltage was measured across the load resistor of 2.68Ω, connected in series with the copper winding, for each excitation frequency. Initially, with a small acceleration of 0.5 g, the low-frequency cantilever with resonance frequency of 25 Hz is observed to contact on the high frequency cantilever. As the frequency increased above 30 Hz, this low-frequency cantilever stopped contacting the high-frequency cantilever because it could not reach it anymore (i.e., the free end of the low-frequency cantilever did not deflect far enough to contact the high-frequency cantilever). As the frequency reached 40 Hz, the low-frequency cantilever with a resonance frequency of 50 Hz started to oscillate and contact the high-frequency cantilever. The low-frequency cantilever with a resonance frequency of 50 Hz contacted the high-frequency cantilever up to 63 Hz. The bandwidth response results show two response bandwidths, each corresponds to one low-frequency cantilever. At acceleration above 1 g, both masses made contacts with the high frequency cantilever, and resulted in a wide bandwidth response from 10 Hz to 63 Hz at 2 g.

Figure 8:
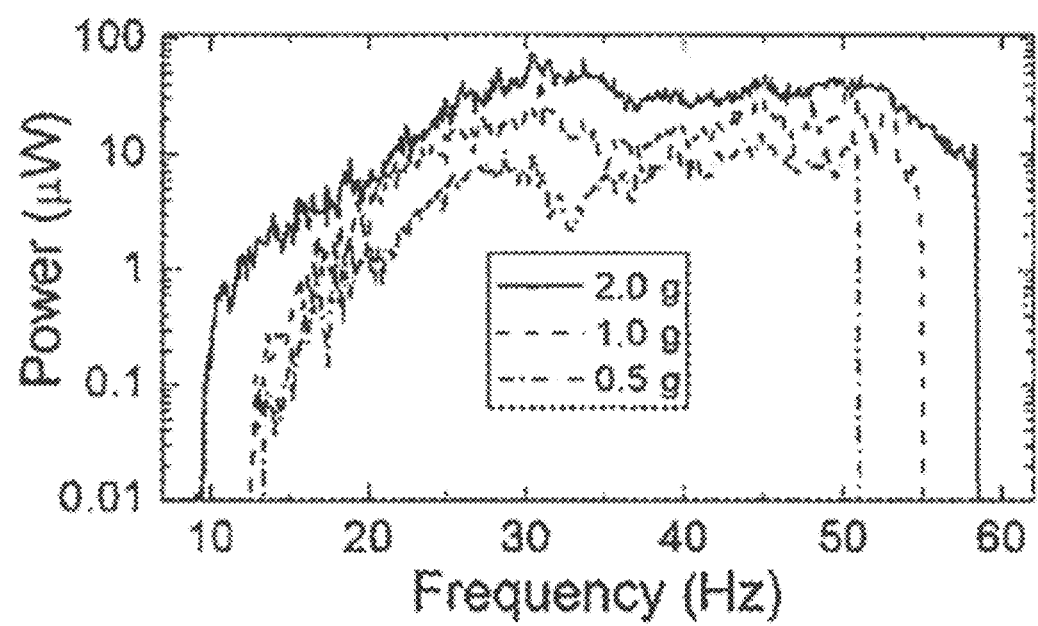
FIG. 8 is a plot of output power versus excitation frequency from Example 1 below, in accordance with an aspect hereof.

Referring to FIG. 8, the wide bandwidth response at acceleration below 1 g can be achieved by adjusting the resonance frequencies of the low-frequency cantilevers closer to each other (for example, 25 Hz and 45 Hz). Having low-frequency cantilevers with resonance frequencies of 25 Hz and 45 Hz allows the low-frequency cantilever having a resonance frequency of 45 Hz to begin contacting the high-frequency cantilever without a gap between the individual response ranges. Even at an acceleration of 0.5 g, both low-frequency cantilever beams made contacts with the high-frequency cantilever beam, and resulted in a wide bandwidth response from 13 Hz to 51 Hz. This wide bandwidth response is narrower than the previous case, but wide enough for many applications with varying ambient frequency.

Figure 9:
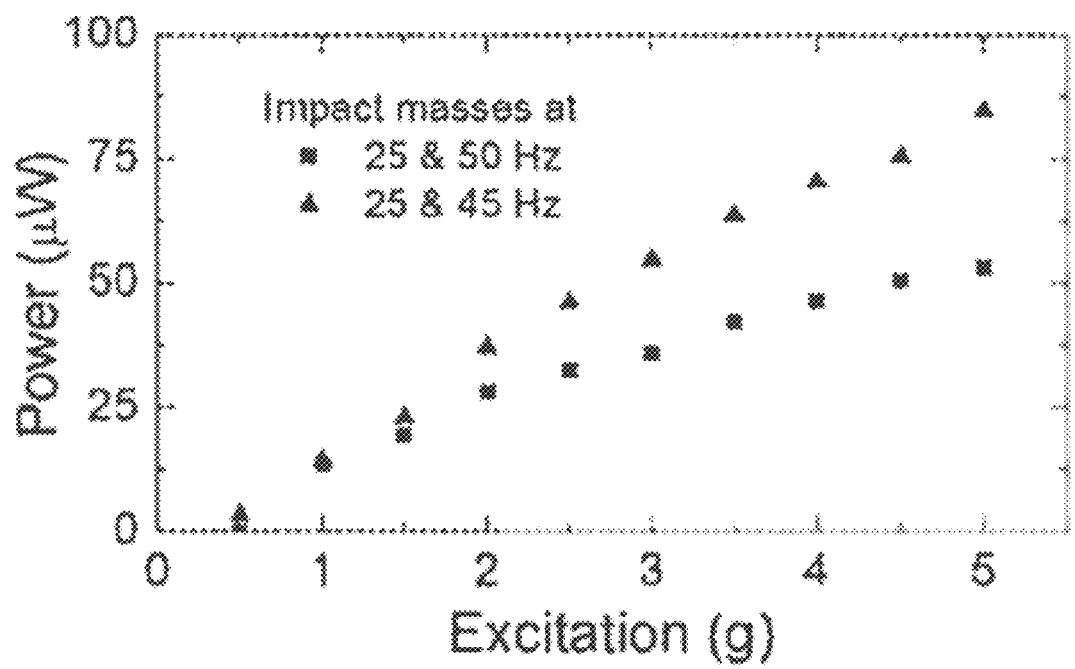
FIG. 9 is a plot of output power versus excitation amplitude from Example 1 below, in accordance with an aspect hereof.

Referring to FIG. 9, the energy harvesting device was then characterized under a fixed excitation frequency of 30 Hz while the excitation strength was varied from 0.5 g to 5 g for both the 25 Hz and 45 Hz configuration and the 25 Hz and 50 Hz configuration. The total measured output power across the load resistor achieved a maximum power of 84.6 μW and 53.3 μW, respectively, under excitation of 5 g. Qualitatively speaking, the oscillator responded with a variable resonance frequency depending on the degree of impact. Therefore, the energy harvesting device had an optimal response over a much broader low-frequency.

Example 2

In a second embodiment, an energy harvesting device comprises a copper winding fixed proximate a free end of a high-frequency cantilever fixed at one side. The high-frequency cantilever of this example is comprised of Aluminum and has a length of 65 mm, a width of 25.4 mm, a thickness of 1.63 mm and a resonance frequency of 210 Hz. The energy harvesting device of this example includes three low-frequency cantilevers configured to contact the high-frequency cantilever in response to mechanical vibration of a certain frequency. The three low-frequency cantilevers of this example are comprised of Brass sheet and have a length of 40 mm, 50 mm, and 55 mm, a width of 6 mm, and a thickness of 0.3 mm, respectively. Each of the three low-frequency cantilevers of this example have a thick impact mass attached proximate a respective free end. The three low-frequency cantilevers of this example are designed to resonate at 12 Hz, 19 Hz, and 40 Hz. The energy harvesting device of this example includes a square shaped permanent NdFeB magnet with a size of ⅜ inch by ⅜ inch by ⅝ inch and surface magnetic field of 6,950 Gauss positioned on a vibrating stage proximate to the free end of the high-frequency cantilever. The energy harvesting device of this example includes a copper winding having a square shape with an area of 12 mm×12 mm and made of 36 gauge copper wire with 200 turns. Each of the impact masses of this example has a mass of 4 grams and is used to reduce the low-frequency cantilevers' resonance frequencies and improve the momentum transfer to the high-frequency cantilever.

When the energy harvesting device was subjected to a low-frequency mechanical vibration using a shaker, the three low-frequency cantilevers responded by vibrating at low frequencies with at least one of them vibrating close to its resonance frequency, and thus their impact masses made contact with the high-frequency cantilever repeatedly at three locations. This contact caused the high-frequency cantilever along with the copper winding to oscillate, relative to the permanent magnet, with decaying amplitude at its resonance frequency. As the high-frequency cantilever oscillated in front of the magnet, an EMF proportional to the relative velocity of the coil and the magnetic field strength was generated. When the generated EMF was applied to a load connected in series with the copper winding, an electric current flowed through the coil due to the magnetic flux change per unit time.

Figure 10:
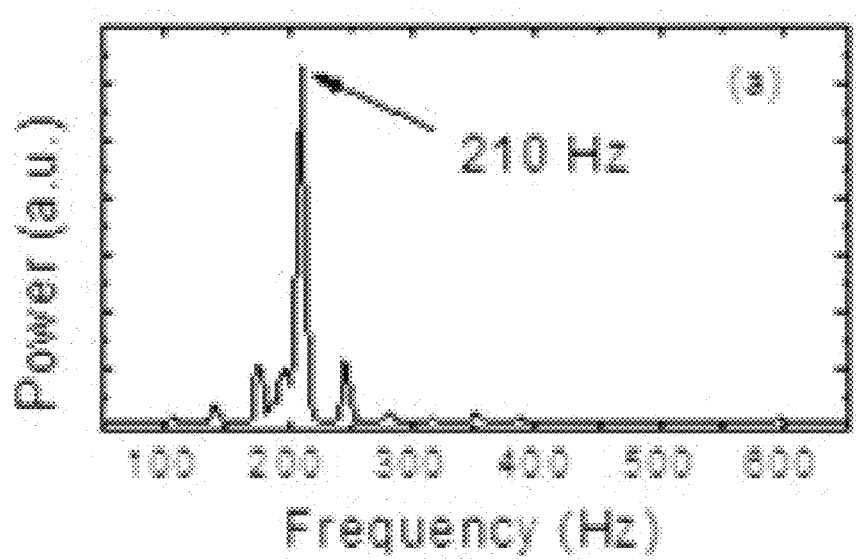
FIG. 10 is a plot of power output versus excitation frequency of the high-frequency cantilever from Example 2 below, in accordance with an aspect hereof.
Figure 11:
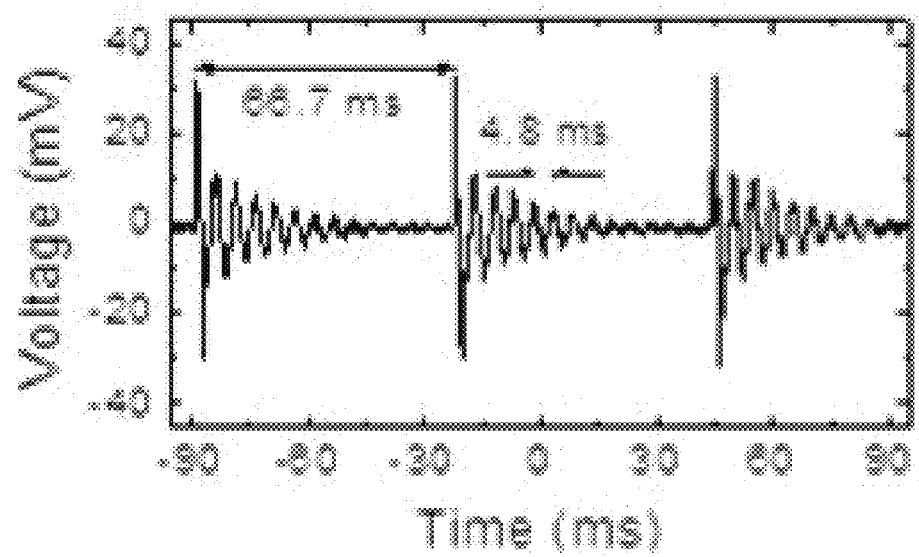
FIG. 11 is a plot of output voltage across the copper winding versus time from Example 2 below, in accordance with an aspect hereof.

The energy harvesting device was characterized by fixing the device and the magnet on a rigid stage on a shaker. An AC signal with different frequencies was applied to the shaker, and the resulting output voltages were measured using an oscilloscope, an AC voltmeter, and a spectrum analyzer. Initially, the optimized load resistor value was determined experimentally. The results showed that the best performance can be achieved with the load resistor values around 22Ω. To determine the resonance frequency of the high-frequency cantilever, the excitation frequency was swept from 100 Hz to 1 kHz, and the generated output voltages across the copper winding were measured using an open circuit measurement and a multimeter. Referring to FIG. 10, the resonance frequency was observed around 210 Hz for low frequency excitation conditions. FIG. 11 depicts typical time domain plots of the measured output AC voltage across the copper winding, with a resistance of 15Ω, when the device was exposed to an ambient vibration at 15 Hz. The plots show oscillations with decaying amplitude at the high-frequency cantilever's resonance frequency of 210 Hz, and the impacts at low-frequency vibration of 15 Hz are also evident. This demonstrates the ability for frequency up-conversion between the low-frequency cantilevers and the high-frequency cantilever. The decaying sine function fit to the output signal confirms that several modes are generated by the contact. The higher order modes decay much faster than the fundamental mode and the fundamental mode survives between each contact. The resonance frequency of the high-frequency cantilever from the theoretical fit to the oscillations is also 210 Hz.

Figure 12:
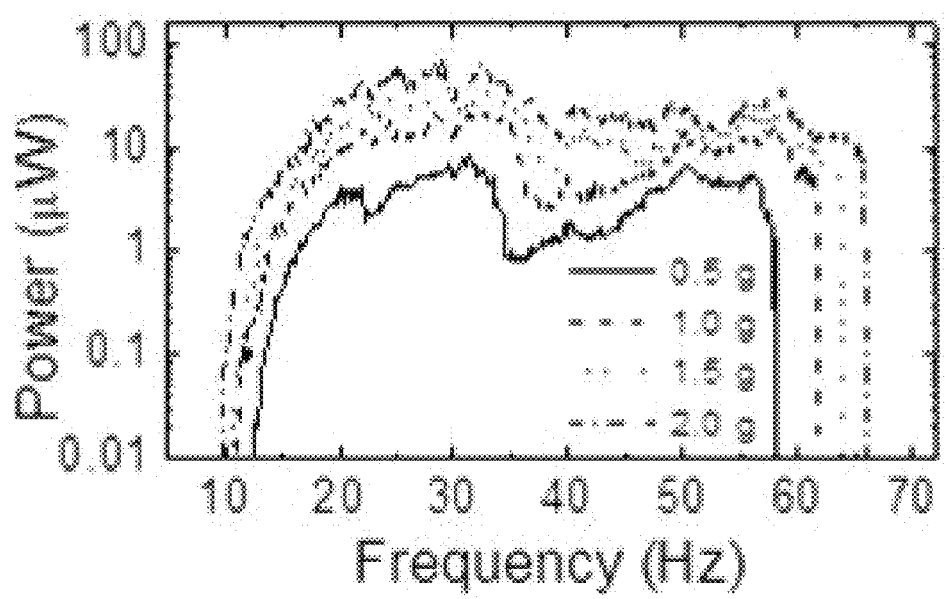
FIG. 12 is a plot of output power versus excitation frequency from Example 2 below, in accordance with an aspect hereof.

Referring now to FIG. 12, to estimate the response bandwidth, the devices were first characterized by sweeping excitation frequency from 5 Hz to 65 Hz with steps of 0.1 Hz under sinusoidal excitations with a constant acceleration of 0.5 g, 1 g, and 2 g, while the output voltage was measured across the load resistor of 22Ω, connected in series with the copper winding, for each excitation frequency. Initially, with a small acceleration of 0.5 g, only one of the low-frequency cantilever beams with a resonance frequency of 13 Hz is observed to impact the high-frequency cantilever. This low-frequency cantilever continued to impact the high-frequency cantilever until 22 Hz. As the frequency increased further, both the first low-frequency cantilever and the second low-frequency cantilever started to make contact with the high-frequency cantilever. As the frequency increased even further, the first low-frequency cantilever stopped contacting the high-frequency cantilever because it could not reach it anymore (i.e., the first low-frequency cantilever did not deflect far enough to contact the high-frequency cantilever) and only the second low-frequency cantilever kept contacting the high-frequency cantilever. This resulted in a wide bandwidth response from 12 Hz to 58 Hz at 0.5 g. At higher acceleration of 1 g and 2 g, the bandwidths were 11 Hz to 62 Hz and 10 Hz to 66 Hz, respectively.

Qualitatively speaking, the oscillator responded with a variable resonance frequency depending on the degree of impact. Therefore, the energy harvesting device had an optimal response over a much broader low frequency.

Example 3

In a third embodiment, an energy harvesting device comprises a variable distance capacitor fixed proximate to a free end of a high-frequency cantilever fixed at one side. The high-frequency cantilever of this example is comprised of Aluminum and has a length of 63 mm, a width of 13 mm, a thickness of 3 mm, and a resonance frequency of 605 Hz. The energy harvesting device of this example includes two low-frequency cantilevers configured to contact the high-frequency cantilever in response to mechanical vibration of a certain frequency. The two low-frequency cantilevers of this example are comprised of Aluminum sheet and have a length of 34 mm and 50 mm, a width of 9.5 mm and 8 mm, and a thickness of 0.5 mm, respectively. Each of the two low-frequency cantilevers of this example has a thick impact mass attached proximate to a respective free end. The two low-frequency cantilevers of this example are designed to resonate at 17 Hz and 25 Hz. Each of the impact masses of this example has a mass of 4 grams and is used to reduce the low-frequency cantilevers' resonance frequencies and improve the momentum transfer to the high-frequency cantilever.

When the energy harvesting device was subjected to a low-frequency mechanical vibration using a shaker, the two low-frequency cantilevers responded by vibrating at low frequencies with at least one of them vibrating close to its resonance frequency, and thus their impact masses made contact with the high-frequency cantilever repeatedly at two locations. This impact caused the high-frequency cantilever along with the variable distance capacitor to oscillate with decaying amplitude at its resonance frequency. After the impact occurs, the absorbed energy by the two low-frequency cantilevers was transferred to the high-frequency cantilever and to the variable distance capacitor, and then to the electrical domain.

Figure 13:
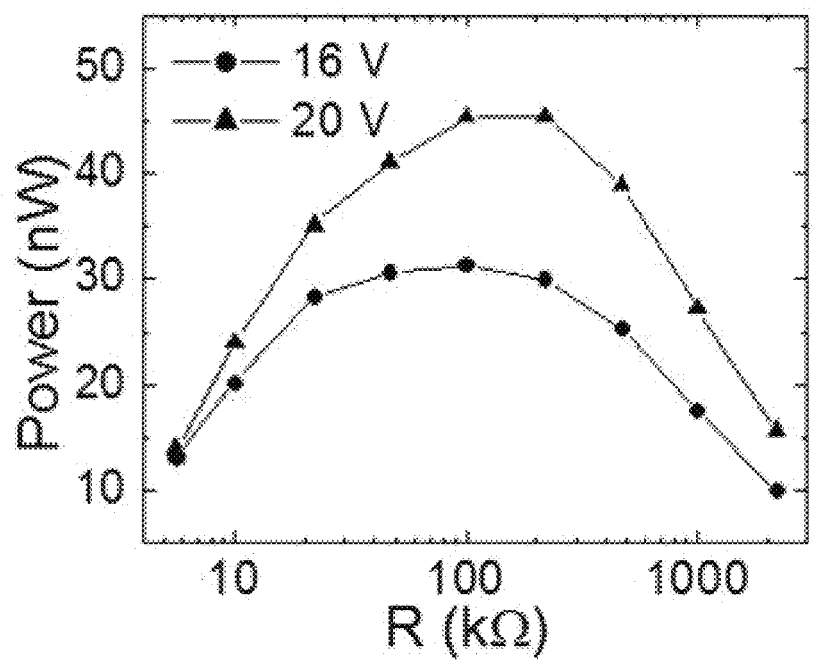
FIG. 13 is a plot of output power versus load resistor from Example 3 below, in accordance with an aspect hereof.
Figure 14:
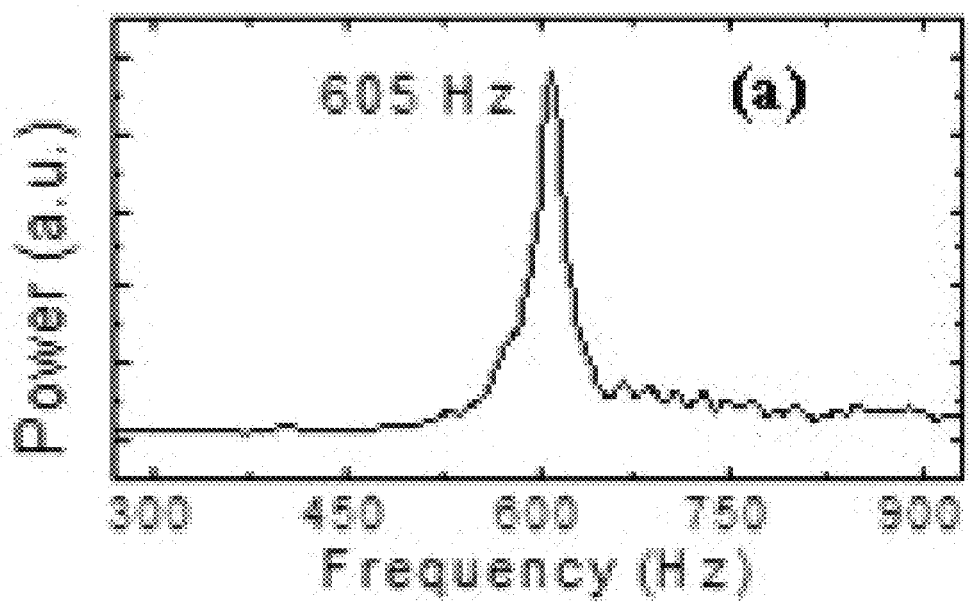
FIG. 14 is a plot of power output versus excitation frequency of the high-frequency cantilever from Example 3 below, in accordance with an aspect hereof.
Figure 15A:
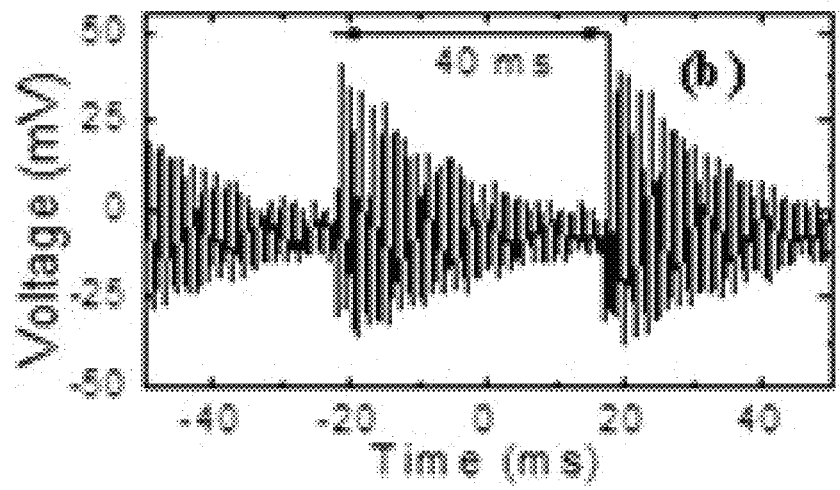
FIG. 15A is a plot of output voltage across a load resistor versus time from Example 3 below, in accordance with an aspect hereof.
Figure 15B:
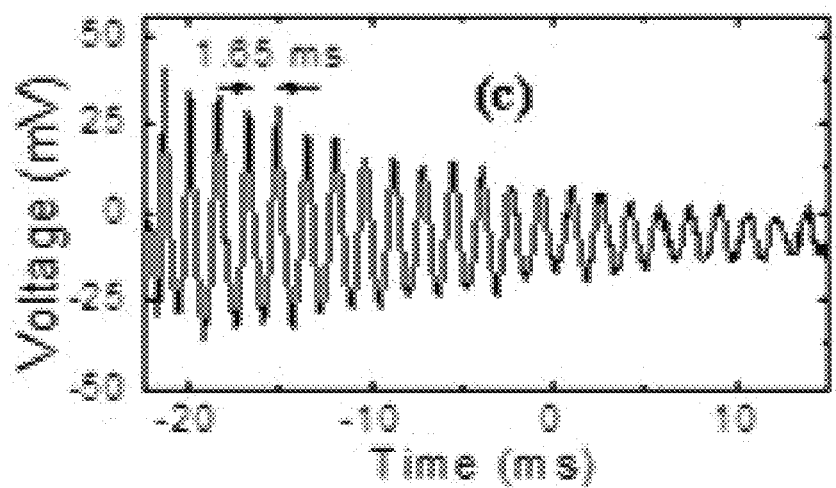
FIG. 15B is a plot of output voltage across a load resistor versus time from Example 3 below, in accordance with an aspect hereof.

The energy harvesting device was characterized by fixing the device on a rigid stage on a shaker. An AC signal with different frequencies was applied to the shaker, and the resulting output voltages were measured across a load resistor connected in series with the variable distance capacitor. Initially, the optimized load resistor value was determined to be approximately 100 kΩ, as depicted in FIG. 13. Referring to FIG. 14, the resonance frequency of the high-frequency cantilever was determined experimentally to be approximately 605 Hz for low voltage excitations. FIGS. 15A and 15B depict a typical time domain plot of the measured output AC voltage across a load resistor, with a resistance of 100 kΩ, when the device was exposed to an ambient vibration at 25 Hz. The plot clearly demonstrates a nonlinear behavior with exponential decay at its resonance frequency of 605 Hz, and the peak-to-peak signal corresponds to a low frequency ambient vibration of 25 Hz. This demonstrates the ability for frequency up-conversion between the low-frequency cantilevers and the high-frequency cantilever.

Figure 16:
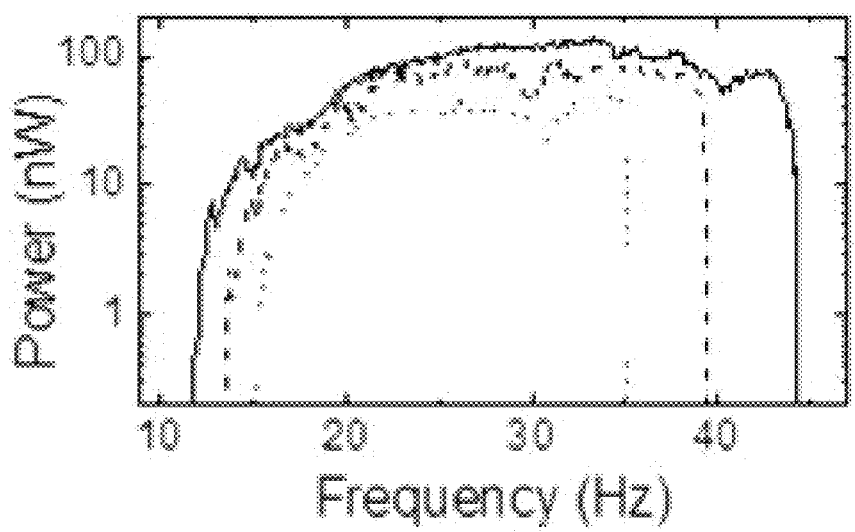
FIG. 16 is a plot of output power versus excitation frequency from Example 3 below, in accordance with an aspect hereof.

Referring now to FIG. 16, to estimate the response bandwidth, the energy harvesting device was first characterized by sweeping excitation frequency from 5 Hz to 50 Hz with steps of 0.1 Hz under sinusoidal excitations with a constant acceleration of 0.5 g, 1 g, and 2 g, while the output voltage was measured across the load resistor. Initially, with a small acceleration of 1 g, only one of the low-frequency cantilevers with a resonance frequency of 17 Hz is observed to contact the high-frequency cantilever. This low-frequency cantilever continued to impact the high-frequency cantilever until 21 Hz. As the frequency increased further, both the first low-frequency cantilever and the second low-frequency cantilever started to make contact with the high-frequency cantilever. As the frequency increased further, the first low-frequency cantilever stopped contacting the high-frequency cantilever because it could not reach it anymore (i.e., the low-frequency did not deflect far enough to contact the high-frequency cantilever) and only the second low-frequency kept contacting the high-frequency cantilever up to 39 Hz.

From the foregoing, it will be seen that aspects described herein are well adapted to attain all of the ends and objects hereinabove set forth, together with other advantages which are obvious and which are inherent to the structure. It will be understood that certain features and subcombinations are of utility and may be employed without reference to other features and subcombinations. This is contemplated by and is within the scope of the claims. Since many possible aspects described herein may be made without departing from the scope thereof, it is to be understood that all matter herein set forth or shown in the accompanying drawings is to be interpreted as illustrative and not in a limiting sense.

What is claimed is:

1. An energy harvesting device for generating electrical power from low frequency oscillations, the device comprising:
   a high-frequency cantilever having a free end;
   a plurality of low-frequency cantilevers, each having a free end configured to contact the high-frequency cantilever in response to environmental vibrations having a frequency within a near-resonance frequency range associated with said low-frequency cantilever; and
   a generator that produces electrical power in response to contact between at least one of the plurality of low-frequency cantilevers and the high-frequency cantilever.

2. The energy harvesting device of claim 1, wherein the resonance frequency of the high-frequency cantilever is at least 200 Hz.

3. The energy harvesting device of claim 1 further comprising:
   an impact mass coupled proximately to the free end of each of the plurality of low-frequency cantilevers.

4. The energy harvesting device of claim 3, wherein the mass of the impact mass is greater than the mass of the generator.

5. The energy harvesting device of claim 3, wherein each impact mass coupled to the plurality of low-frequency cantilevers is positioned between the respective low-frequency cantilever and the high-frequency cantilever.

6. The energy harvesting device of claim 1, wherein at least one of the plurality of low-frequency cantilevers contacts the high-frequency cantilever when environmental vibrations having a frequency between 10 Hz and 66 Hz are received by the energy harvesting device.

7. The energy harvesting device of claim 1, wherein the plurality of low-frequency cantilevers comprise a first low-frequency cantilever and a second low-frequency cantilever.

8. The energy harvesting device of claim 7, wherein the first low-frequency cantilever has a first near-resonance frequency range between 10 Hz and 35 Hz and the second low-frequency cantilever has a second near-resonance frequency range between 30 Hz and 66 Hz.

9. The energy harvesting device of claim 7, wherein the plurality of low-frequency cantilevers further comprises a third low-frequency cantilever.

10. The energy harvesting device of claim 9, wherein the first low-frequency cantilever has a first near-resonance frequency range between 10 Hz and 27 Hz, the second low-frequency cantilever has a second near-resonance frequency range between 22 Hz and 34 Hz, and the third low-frequency cantilever has a third near-resonance frequency range between 31 Hz and 66 Hz.

11. The energy harvesting device of claim 1, wherein each of the high-frequency cantilever and the plurality of low-frequency cantilevers are coupled to a common base.

12. The energy harvesting device of claim 11, wherein the generator comprises an induction mechanism.

13. The energy harvesting device of claim 12, wherein the induction mechanism comprises a conductor coupled to the high-frequency cantilever proximate the free end and a magnet coupled to the common base proximate the free end of the high-frequency cantilever.

14. The energy harvesting device of claim 13, wherein the conductor comprises a copper winding having at least 100 turns.

15. The energy harvesting device of claim 1, wherein the generator comprises a variable distance capacitor coupled to the high-frequency cantilever proximate the free end.

16. The energy harvesting device of claim 1, wherein the generator is integral to the high-frequency cantilever and comprises a piezo-electric material.

* * * * *